(12) United States Patent
Miller (10) Patent No.: US 8,650,493 B2
(45) Date of Patent: Feb. 11, 2014

(54) METHOD AND SYSTEM FOR TESTING WEBSITES

(71) Applicant: Software Research Inc., San Francisco, CA (US)

(72) Inventor: Edward F. Miller, San Francisco, CA (US)

(73) Assignee: Software Research, Inc., San Francisco, CA (US)

(*) Notice: Subject to any disclaimer, the term of this patent is extended or adjusted under 35 U.S.C. 154(b) by 0 days.

(21) Appl. No.: 13/672,599

(22) Filed: Nov. 8, 2012

(65) Prior Publication Data

US 2013/0097486 A1    Apr. 18, 2013

Related U.S. Application Data (63) Continuation of application No. 12/795,553, filed on Jun. 7, 2010, now Pat. No. 8,327,271, which is a continuation of application No. 11/758,624, filed on Jun. 5, 2007, now Pat. No. 7,757,175, which is a continuation of application No. 10/041,768, filed on Oct. 31, 2001, now Pat. No. 7,231,606.

(60) Provisional application No. 60/293,879, filed on May 24, 2001, provisional application No. 60/244,818, filed on Oct. 31, 2000.

(51) Int. Cl.
*G06F 3/00* (2006.01)

(52) U.S. Cl.
USPC .......................................................... 715/738

(58) Field of Classification Search
USPC .......................................................... 715/738
See application file for complete search history.

(56) References Cited

U.S. PATENT DOCUMENTS

| | | | |
|---|---|---|---|
| 6,002,871 A | 12/1999 | Duggan et al. |
| 6,044,398 A | 3/2000 | Marullo et al. |
| 6,138,157 A | 10/2000 | Welter et al. |
| 6,151,599 A | 11/2000 | Shrader et al. |
| 6,157,940 A | 12/2000 | Marullo et al. |
| 6,185,701 B1 | 2/2001 | Marullo et al. |

(Continued)

FOREIGN PATENT DOCUMENTS

WO    WO 01/10082 A2    2/2001

OTHER PUBLICATIONS

Notice of Allowance of U.S. Appl. No. 13/764,628 mailed May 15, 2013.

(Continued)

*Primary Examiner* — Enrique Iturralde (57) ABSTRACT

A method and system is provided for testing and analyzing websites via a test-enabled web browser. When requested, a representative embodiment can provide for deep recording of user interactions as they relate to a specific web page currently on display in the browser view area, for extracting key information from the current web page sufficient to validate that a future playback does or does not produce the same effects on the chosen website page, for playing back a prior recording to confirm that a website page continues to pass the user-defined tests, and/or for providing detailed analyzes based on the specific contents of the current website page. The general result of systematic use of the test-enabled browser on websites is improved content quality, demonstrated website server behavior for deep tests, quicker delivery by the website server, and better serviceability for e-business.

28 Claims, 3 Drawing Sheets

(56) References Cited

U.S. PATENT DOCUMENTS

| | | | |
|---|---|---|---|
| 6,393,479 | B1 | 5/2002 | Glommen et al. |
| 6,418,544 | B1 | 7/2002 | Nesbitt et al. |
| 6,421,070 | B1 | 7/2002 | Ramos et al. |
| 6,446,120 | B1 | 9/2002 | Dantressangle |
| 6,522,995 | B1 | 2/2003 | Conti et al. |
| 6,549,944 | B1 | 4/2003 | Weinberg et al. |
| 6,587,969 | B1 | 7/2003 | Weinberg et al. |
| 6,601,020 | B1 | 7/2003 | Myers |
| 6,662,217 | B1 | 12/2003 | Godfrey et al. |
| 6,684,204 | B1 | 1/2004 | Lal |
| 6,741,967 | B1 | 5/2004 | Wu et al. |
| 6,754,701 | B1 | 6/2004 | Kessner |
| 6,775,644 | B2 | 8/2004 | Myers |
| 6,865,599 | B2 | 3/2005 | Zhang |
| 6,918,066 | B2 | 7/2005 | Dutta et al. |
| 6,954,922 | B2 | 10/2005 | Liang |
| 6,993,748 | B2 | 1/2006 | Schaefer |
| 7,000,224 | B1 | 2/2006 | Osborne, II et al. |
| 7,013,251 | B1 | 3/2006 | Nace et al. |
| 7,043,546 | B2 | 5/2006 | Smith et al. |
| 7,072,935 | B2 | 7/2006 | Kehoe et al. |
| 7,231,606 | B2 | 6/2007 | Miller et al. |
| 7,299,457 | B2 | 11/2007 | Marshall |
| 7,313,595 | B2 | 12/2007 | Rust |
| 7,316,003 | B1 | 1/2008 | Dulepet et al. |
| 7,337,349 | B2 | 2/2008 | Braunels et al. |
| 7,363,616 | B2 | 4/2008 | Kalyanaraman |
| 7,461,346 | B2 | 12/2008 | Fildebrandt |
| 7,752,326 | B2 | 7/2010 | Smit |
| 7,757,175 | B2 | 7/2010 | Miller et al. |
| 7,849,162 | B2 | 12/2010 | Davis et al. |
| 8,032,626 | B1 | 10/2011 | Russell et al. |
| 8,095,882 | B2 * | 1/2012 | Kashi .......................... 715/763 |
| 8,327,271 | B2 | 12/2012 | Miller |
| 8,392,890 | B2 | 3/2013 | Miller |
| 8,495,585 | B2 | 7/2013 | Miller |
| 2002/0035498 | A1 | 3/2002 | Kehoe et al. |
| 2002/0038388 | A1 | 3/2002 | Netter |
| 2002/0109717 | A1 | 8/2002 | Li et al. |
| 2002/0138226 | A1 | 9/2002 | Doane |
| 2003/0005044 | A1 | 1/2003 | Miller et al. |
| 2003/0053420 | A1 | 3/2003 | Duckett et al. |
| 2004/0010587 | A1 | 1/2004 | Altamirano et al. |
| 2004/0039550 | A1 | 2/2004 | Myers |
| 2004/0054728 | A1 | 3/2004 | Rust |
| 2004/0111488 | A1 | 6/2004 | Allan |
| 2004/0261026 | A1 | 12/2004 | Corson |
| 2005/0166094 | A1 | 7/2005 | Blackwell et al. |
| 2005/0203902 | A1 | 9/2005 | Davis et al. |
| 2005/0246153 | A1 | 11/2005 | Genkin et al. |
| 2006/0005066 | A1 | 1/2006 | Brauneis et al. |
| 2006/0031663 | A1 | 2/2006 | Peller et al. |
| 2006/0048214 | A1 | 3/2006 | Pennington et al. |
| 2006/0069961 | A1 | 3/2006 | Kalyanaraman |
| 2006/0101404 | A1 | 5/2006 | Popp et al. |
| 2007/0006036 | A1 | 1/2007 | Devas et al. |
| 2007/0115984 | A1 | 5/2007 | Kumar et al. |
| 2007/0150556 | A1 | 6/2007 | Fukuda et al. |
| 2007/0234217 | A1 | 10/2007 | Miller |
| 2008/0184102 | A1 | 7/2008 | Selig |
| 2009/0228805 | A1 | 9/2009 | Ruehle |
| 2009/0249216 | A1 | 10/2009 | Charka et al. |

OTHER PUBLICATIONS

Office Action for U.S. Appl. No. 13/764,635, mailed Jun. 6, 2013.
Strange, "The $60 Web-Test Toolbox", Better Software, Oct. 2006, 3 pgs.
"Browser Compatibility Check for Internet Explorer Versions from 5.5 to 8", Retrieved at <<http://my-debugbar.com/wiki/IETester/HomePage>>, Copyright 2001-2009, pp. 2.
"Check Browser Compatibility, Cross Platform Browser Test", Retrieved at <<http://browershots.org/>>, Jun. 9, 2005, p. 1.
"Conference Program & Expo Guide", Vendor Technical Presentation, Website Validation Technology (VT19), the 12th International Software Quality Week 1999, San Jose, CA, May 24-28, 1999, 2 pgs.
"Conference Tutorials Expo Sponsors", conference information and Website Validation Technology (VT19), the 12th International Software Quality Week 1999, San Jose, CA, May 24-28, 1999, 4 pgs.
"Document Object Model (DOM) Level I Specification Version 1.0" W3C, Oct. 1, 1998, pp. 1-169.
"E-Commerce Reliability and Web Site Testing," sides, presented at the Third International Software Quality Week Europe 1999, Brussels, Belgium, Nov. 1-5, 1999, 14 pages.
"Expression Web SuperPreview", Retrieved at <<http://expression.mircosoft.com/en-us/dd565874(printer).aspx>>, no later than Oct. 13, 2009, pp. 2.
"Expression Web SuperPreview", Retrieved at <<http://visitmix.com/News/Expression-Web-SuperPreview>>, Mar. 18, 2009, pp. 3.
"Firebug (Firefox extension)", Retrieved at <<http://enwikipedia.org.wiki/Firebug_(Firefox_extension)>>, Jul. 18, 2009, pp. 1.
"First Browser Based Web Testing Tool Provides Accuracy Breakthrough," Press Release, eValid, Inc., Sep. 6, 2000.
"Functional/Regression Test Tools", Retrieved at <<http://www.qcforum.org/viewtopic.php?id=14>>, Apr. 4, 2008, pp. 8.
"IBM Rational Functional Tester Proxy SDK Reference", Retrieved at <<htpp://publib.boulder.ibm.com/infocenter/rfthelp/v7r0m0/index.jsp?topic=/com.rational.test.ft.proxy.api.help/ProxyApiReference/overview-summary.html>>, Oct. 9, 2009, pp. 5.
"Internet Explorer Developer Toolbar", Retrieved at <<http://en.wikipedia.org/wiki/Internet_Explorer_developer_Toolbar>>, Jun. 1, 2009, pp. 2.
"Netrenderer", Retrieved at <<http://ipinfo.info/netrenderer/index.php?>>, Oct. 12, 2007, p. 1.
"Products.new", Software Magazine, vol. 19, Issue 2, p. 67, plus front page of magazine and one page advertisement, Sep. 1999.
Ready, Set, eValid, advertisement, Appliction Development Trends, www.adtmag.com, 2 pages, Nov. 2000.
"Record and Playback for IBM Rational Functional Tester 7.0 does not Work on HTML Browser Menu Options", Retrieved at <<http://www-01.ibm.com/support/docview.wss?uid=swg2125183>> Oct. 9, 2009, p. 1.
"Selenium-RC", Retrieved at <<http://seleniumhq.org/docs/05_selenium_rc.html>>, Oct. 13, 2009, pp. 21.
"Software Research Announces CAPBAK/Web to Test Reliability of Web Sites", Press Release Software Research Inc., 4 pages, Jul. 26, 1999.
SR Announces New Testing Application Suite for the Web: STW/Web:, Press Release Software Research Inc., 2 pages, Feb. 12, 1996.
"Testing Techniques Newsletter (TTN)," On-line edition, Jul. 1999, pp. 1-18.
"Website Validation Technology", conference slides, the 12th International Software Quality Week 1999, San Jose, CA, May 24-28, 1999, 20 pgs.
"Automated Testing with TestComplete 8", Automated Testing Tools, http://smartbear.com/products/qa=tools/automated-testing. downloaded Nov. 20, 2011, 3 pages.
"DejaClick", DejaClick—Wikipedia, the free encyclopedia, http://en.wikipedia.org/wiki/Dejaclick, downloaded Nov. 20, 2011, 2 pages.
"Interface WebDriver", WebDriver, http://selenium.googlecode.com/svn/truck/docs/api/java/org/openqa.selenium/WebDriver.html, downloaded Nov. 20, 2011, 7 pages.
"Internet Explorer", Wikipedia, the free encyclopedia, http://en.wikipedia.org/wiki/Internet_Explorer, downloaded Dec. 9, 2011, 26 pages.
"Keynote Kite", Learn about—Keynote Internet Testing Environment, http://kite.keynote.com/how-it-works.php, downloaded Nov. 20, 2011, 3 pages.
"Keynote Kite", Test Website|Testing Web Applications|Application Performance Testing—KITE, http://kite.keynote.com, downloaded Nov. 20, 2011, 1 page.
"Keynote Systems Introduces AJAX-Based Testing Tool for Rich Web 2.0 Sites", http://in.sy-con.com/node/451642/print, downloaded Nov. 20, 2011, 2 pages.

(56) References Cited

OTHER PUBLICATIONS

"Keynote systems", Keynote systems—Wikipedia, the free encyclopedia, http://en.wikipedia.org/wiki/Keynote_systems, downloaded Nov. 20, 2011, 4 pages.
"Open Source at Google", Introducing WebDriver—Google Open Source Blog, http://google-opensource.blogspot.com/2009/05/introducing-webdriver.html, May 8, 2009, 3 pages.
"Printable Watir Tutorial", Printable Tutorial—Watir—OpenQA Wiki, http://wiki.openqa.org/display/WTR/Printable+Tutorial, downloaded Nov. 20, 2011, 49 pages.
"Project Home", Project Home—Watir—OpenQA Wiki, http://wiki.openqa.org/display/WTR/Project+Home, downloaded Nov. 20, 2011, 2 pages.
"Selenium (software)" Selenium (software), Wikipedia, the free encyclopedia, http://en.wikipedia.org.wiki.Selenium_(software), downloaded Nov. 20, 2011, 3 pages.
"Selenium Documentation", http://seleniumhq.org/docs, downloaded Nov. 20, 2011, 3 pages.
"Selenium Users", Selenium Users=Google Groups, http://groups.google.com/group/selenium-users/about, downloaded Nov. 20, 2011, 2 pages.
"Selenium-IDE, Selenium-IDE-Selenium Documentation", http://seleniumhq.org.docs.02_selenium_ide.html#the-watfor-commands-in-ajax-applications, downloaded Nov. 20, 2011, 46 pages.
"SWExplorerAutomation (SWEA)", Webius—Webius Internet Explorer Automation, http://webiussoft.com, downloaded Nov. 20, 2011, 2 pages.
"Test Automation for Web Applications", Introduction—Selenium Documentation, http://seleiumhq.org/docs/01_introducing_selenium.html#brief-history_of . . . , downloaded Nov. 20, 2011, 8 pages.
"TestComplete", TestComplete—Wikipedia, the free encyclopedia, http://en.wikipedia.org.wiki.Testcomplete, downloaded Nov. 20, 2011, 4 pages.
"Waitr General—Discussion", Discussions—Watir Generall Google Group, http://groups.google.com/group/watir-general/topics?tsc=2, downloaded Nov. 20, 2011, 3 pages.
"Watir.com", Watir.com|Web Application Testing in Ruby, http://watir.com/, downloaded Nov. 20, 2011, 7 pages.
"Watir", Watir—Wikipedia, the free encyclopedia, http://en.wikipedia.org.wiki/Watir, downloaded Nov. 20, 2011, 3 pages.
"Webdriver", Webdriver|Google Groups, http://groups.google.com/group/webdriver/about, downloaded Nov. 20, 2011, 2 pages.
"What is DejaClick?", DejaClick™ by AlertSite®, http://www.dejaclick.com/, downloaded Nov. 20, 2011, 2 pages.
Advisory Action for U.S. Appl. No. 10/041,768 mailed Sep. 9, 2005.
Ajax (programming) Wikipedia Downloaded Aug. 11, 2011, pp. 1-4.
Author Unknown, "Successful Deployment of Ajax and OpenAjax", Originally published at www.openajaz.org, Archived Feb. 26, 2008 at <http://web.archive.org/web/20080226021111/http://www.openajax.org/whitepapers/Successful%20Deployment%20of%20Ajax%20and%OpenAjax.php>.
Cugini et al., "Design of a File Format for Logging Website Interaction", Retrieved at <<http://zing.ncsl.nist.gov/cugini/webmet/flud.design-paper.html>>, Apr. 2001, pp. 9.
Document Object Model, Wikipedia, downloaded Jul. 7, 2011, pp. 1-6.
Eaton, et al., "Position Paper: Improving Browsing Environment Compliance Evaluations for Websites", Retrieved at <<http://conferenze.dei.polimi.it/wq04/final/paper04.pdf>>, Oct. 9, 2009, pp. 6.
Edward Miller, "WebSite Testing," White paper, 2000 (printed on Oct. 31, 2000).
Edward Miller, "WebSite Testing," White paper, presented at the Third International Software Quality Week Europe 1999, Brussels, Belgium, Nov. 1-5, 1999.
eValid User Manual, v7, Software Research, Inc., May 21, 2007, 677 pgs.
eValid User Manual, v8, Software Research, Inc., Jan. 28, 2008, 894 pgs.
eValid, "E-Commerce Reliability and Web Site Testing," (with attached video graphics), presented at the Third International Software Quality Week Europe 1999, Brussels, Belgium, Nov. 1-5, 1999.
eValid, "Subscription Test TeleServices, Custom Website Testing and Validation, Web Site Quality Consulting," presented at the Third International Software Quality Week Europe 1999, Brussels, Belgium, Nov. 1-5, 1999.
Final Office Action for U.S. Appl. No. 12/247,753, mailed Jul. 11, 2012.
Final Office Action for U.S. Appl. No. 12/247,753, mailed May 16, 2012.
Finlay, "Web Testing Tools Break Out of Windows GUI", SD Times, www.sdtimes.com, 3 pages, Oct. 15, 2000.
Fruhlinder, Joshua, "Cross-Brower Web Application Testing Made Easy", Retrieved at <<http://www.ibm.com/developerworks/web/library/wa-crossbrowser/>>, Dec. 18, 2007, pp. 11.
JavaScript, Wikipedia, Downloaded Aug. 14, 2011 pp. 1-20.
Marchetto, A.: Tonella, P.: Ricca, F.;, "State-Based Testing of Ajax Web Applications," Software Testing, Verification, and Validatin, 2008 1st International Conference on, vol., No., pp. 121-130, Apr. 9-11, 2008 doi: 10.1109/ICST.2008.22 URL:http://ieeexplore.ieee.org/stamp/stamp.jsp?tp=&arnumber=4539539 &isnumber=4539517.
Notice of Allowance for U.S. Appl. No. 10/041,768 mailed Feb. 8, 2007.
Notice of Allowance for U.S. Appl. No. 11/758,624 mailed Mar. 23, 2010.
Notice of Allowance for U.S. Appl. No. 12/247,753, mailed Aug. 26, 2011.
Notice of Allowance for U.S. Appl. No. 12/247,753, mailed Dec. 12, 2011.
Notice of Allowance for U.S. Appl. No. 12/795,553, mailed Sep. 27, 2012.
Office Action for U.S. Appl. No. 10/041,768 mailed Aug. 23, 2006.
Office Action for U.S. Appl. No. 10/041,768 mailed Dec. 28, 2005.
Office Action for U.S. Appl. No. 10/041,768 mailed Feb. 14, 2005.
Office Action for U.S. Appl. No. 10/041,768 mailed Jul. 2, 2004.
Office Action for U.S. Appl. No. 10/041,768 mailed May 13, 2005.
Office Action for U.S. Appl. No. 10/041,768 mailed Jan. 16, 2007.
Office Action for U.S. Appl. No. 11/758,624 mailed Sep. 17, 2009.
Office Action for U.S. Appl. No. 12/247,753, mailed Mar. 3, 2011.
Office Action for U.S. Appl. No. 12/247,753, mailed Mar. 22, 2012.
Advisory Action for U.S. Appl. No. 12/247,753, mailed Aug. 28, 2012.
Office Action for U.S. Appl. No. 12/795,553, mailed Mar. 8, 2012.
Product Release Notes, CAPBAK/Web (IE) for Windows NT and Windows 2000, Mar. 21, 2000.
Product Release Notes, CAPBAK/Web (IE) Ver. 1.5, Nov. 24, 1999.
Salzmann, "Java Product News", JavaWorld, www.javaworld.com/javaworld/jw-10-2000/jw-1020-newsbrief.html, 4 pages, Oct. 20, 2000.
Software Tech News, "WebSite Testing-Software Testing," vol. 3, No. 2, printed from http://dacs.dtic.mil/awareness/newsletters/stn3-2/toc.html on Oct. 31, 2000.
The Third International Software Quality Week Europe 1999: Lessons Learned, Seminar/Conference outline, Brussels, Belgium, Nov. 1-5, 1999.
The Thirteenth International Software & Internet Quality Week, Registration Materials for Seminar/Conference, San Francisco, CA, May 30-Jun. 2, 2000.
U.S. Appl. No. 12/247,753, filed Nov. 18, 2008.
U.S. Appl. No. 12/795,553, filed Jun. 7, 2010.
W3C Document Object Mode, W3C, www.w3.org/dom, pp. 1-3.
Xiong et al., "Testing Ajax Applications with Selenium", InfoQ, www.infoq.com/articles/testing-ajax-selenium>, Sep. 25, 2006, 8 pages.
Office Action for U.S. Appl. No. 12/247,753, mailed Oct. 26, 2012.
U.S. Appl. No. 13/764,635, filed Feb. 11, 2013.
U.S. Appl. No. 13/764,628, filed Feb. 11, 2013.

\* cited by examiner

METHOD AND SYSTEM FOR TESTING WEBSITES

CROSS-REFERENCE TO RELATED APPLICATIONS

This application is a continuation of U.S. patent application Ser. No. 12/795,553, filed Jun. 7, 2010, and entitled "METHOD AND SYSTEM FOR TESTING WEBSITES", which is hereby incorporated by reference herein, and which is in turn a continuation of U.S. patent application Ser. No. 11/758,624, filed Jun. 5, 2007, and entitled "METHOD AND SYSTEM FOR TESTING WEBSITES", now U.S. Pat. No. 7,757,175, which is hereby incorporated by reference herein, and which is in turn a continuation of U.S. patent application Ser. No. 10/041,768, filed Oct. 31, 2001, and entitled "METHOD AND SYSTEM FOR TESTING WEBSITES", now U.S. Pat. No. 7,231,606, which is hereby incorporated by reference herein, and which in turn claims the benefit of (i) U.S. Provisional Patent Application No. 60/293,879, filed May 24, 2001, and entitled "METHOD AND SYSTEM FOR TESTING WEBSITES", and which is hereby incorporated by reference herein; and (ii) U.S. Provisional Patent Application No. 60/244,818, filed Oct. 31, 2000, and entitled "METHOD AND SYSTEM FOR TESTING WEBSITES", and which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to software testing and, more particularly, to automated analysis and testing of websites.

2. Description of the Related Art

Websites are complex collections of information intended to be viewed and used and interacted with by sending information from a server (website server) over the Internet to users who work with this information from an internet browser client program (internet browser) that typically runs on a personal computer or other computing device. A common Internet browser is Internet Explorer (IE) by Microsoft Corporation. The IE browser runs on the Microsoft Windows NT and Windows 2000 operating systems.

Testing and analysis of websites is needed to: (i) confirm content and proper operation and proper content (i.e., functional testing and validation); (ii) determine delivered performance of a website server (i.e., website timing and tuning); (iii) analyze capacity of the website server by imposing realistic loads (i.e., website server loading); and (iv) identify erroneous website pages (i.e., site analysis).

Conventionally, there are several alternative methods that can be used to obtain information about how a website behaves when viewed from the Windows environment. One conventional method intercepts a Windows event loop. Another conventional method intercepts a HTTP protocol sequence by building a wrapper or proxy around an instance of the Internet browser. Both of these conventional methods have disadvantages. One disadvantage of intercepting the Windows event loop is that every keyboard activity and/or mouse activity at the primitive level of its interaction with the operating system must be handled. This leads to cumbersome programming. One disadvantage of intercepting of the HTTP protocol sequence via a wrapper or proxy is that the focus is on the communication between the Internet browser and the server.

Thus there is a need for improved approaches to testing websites.

SUMMARY OF THE INVENTION

Broadly speaking, the invention relates to improved approaches for testing websites. According to one aspect of the invention website testing is performed in a browser environment. As such, information for testing can be obtained from a browser that is able to perform automated analysis and testing of websites. For example, the browser can emulate operation of an Internet Explorer (IE) browser while having additional functionality to provide automated analysis and testing of websites. The invention can thus be implemented in a test-enabled Internet browser.

The invention can be implemented in numerous ways including, a method, system, device, graphical user interface, and a computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Broadly speaking, the invention relates to improved approaches for testing websites. According to one aspect of the invention website testing is performed in a browser environment. As such, information for testing can be obtained from a browser that is able to perform automated analysis and testing of websites. For example, the browser can emulate operation of an Internet Explorer (IE) browser while providing additional functionality to provide automated analysis and testing of websites. The invention can thus be implemented in a test-enabled Internet browser.

By performing website testing in a browser environment, various advantages can be facilitated. These advantages can include: greater control of the test process, ability to measure at a fine level of detail, ability to manipulate and validate the contents of website pages as they are rendered, and ability to extract linking and other information from website pages in their fully rendered form.

There are various inventive aspects to the invention. Several of the invention aspects are as follows. These and other aspects described herein can be used separately or in any combination.

According to a general aspect of the invention website testing is performed in a browser environment. As such, information for testing can be obtained from a browser that is able to perform automated analysis and testing of websites. For example, the browser can emulate operation of an Internet Explorer (IE) browser while providing additional functionality to provide automated analysis and testing of websites. The invention can thus be implemented in a test-enabled Internet browser.

The invention enables the analysis of websites to produce a script-like recording that captures the essence of user activity for purposes of playback against the website server that will serve to reproduce the behavior noted during the recording, the capture during the recording process of validation information that can be used to ascertain after the fact if the website under test has changed, the actual playback of scripts recording in accordance with the above, and the automatic development of PASS/FAIL results based on whether the validation facts written in the script are true at the time of playback. The invention also enables analysis of the times the invention records as it plays back certain events, the emulation of multiple users for purposes of generating the load equivalent to multiple users as seen by a website server, and the static analysis of individual website pages to ascertain certain properties of them, their dependence on other pages, and the availability, download size and speed, and other quantitative factors and measurements about them.

According a first aspect of the invention, record and playback capabilities are provided. Here, a test-enabled web browser is used in the normal way to interact with the website under test. During this interaction, the user can command certain kinds of data to be extracted into a script file as a part of the recording process. The resulting recording is thus typically not a detailed record of user keyboard and mouse activity such as might be achieved by intercepting the Windows event loop, but instead is an abstraction of that activity based on analysis of the event triggers that happen as a consequence of the user taking action(s). In one embodiment, the test enabled web browser is implemented such that it web browsing operations are identical to that in an IE browser because the same Dynamic Linked Libraries (DLLs) as are used in the underlying Windows environment. The recording that results will, on playback, interact with the website under test to produce the same results as were attained at the time the recording was made, assuming that the website under test has not changed. This mode of operation is important to proper operation of the invention as a regression and test system because this mode permits recordings to behave in a way that reveals actual content and behavior errors, but not to be confused by variations in type font and user presentation of the information that the browser extracts from the website. In one representative embodiment this information can be kept in a standard ASCII file.

Overall timing of the recording process can be preserved in a series of wait commands within the script that cause the playback engine to emulate the user "think time" with 1.0 millisecond precision. The nature of the recording mechanism in the invention makes it possible to assure that full synchronization occurs during playback, even if some parts of the website server behave faster or slower than during the recording.

According a second aspect of the invention, validation capabilities are provided. During recording a user can select and specify certain information that is extracted immediately from the current rendition of a web page and which is deposited in special formats within the recorded script. This information can include such facts as the specific content of a part of a web page at a particular element count offset, the date and file details of an image, the checksum (the sum of all of the pixels) of a selected region of an image on a page, etc. At playback time, this information can be checked using an internal model of the web page. If the validation checkpoints fail, then error messages and other kinds of responses are given. In the representative embodiment this information is kept in a series of ASCII logfiles.

According a third aspect of the invention, script playback is provided. During playback, the script is read and interpretively executed by the invention and the instructions are fed to the test-enabled web browser so that it will act identically the way the user acted during the recording process in terms of producing the identical same effect. Any wait time values that are noted from the script can be played back (i.e., counted out) at a specific playback multiplier ratio in relation to real time. If the multiplier is 0, then all waits are set to zero. However, the nature of the recording mechanism in the invention makes it possible to assure that full synchronization occurs during playback, even if some parts of the website server behave faster or slower than during the recording. In one embodiment, the script playback can take on an adaptive nature so that changes to web pages can be gracefully tolerated.

According a fourth aspect of the invention, timing evaluations are provided. In addition to wait times which were discussed above, the invention measures details of web page component downloads by monitoring the contents of a cache. All of the phases of download of pages can be monitored for detailed timing values, including base page download, linked page download (JavaScript and Cascading Style Sheets (CSSs) etc.), plus individual images files and other supporting pages that are reference by the web page as it is being downloaded. According to one embodiment, the invention takes times from its internal 1.0 millisecond clock and associates these times to the actual (measured) download timings for every part of a web page and its components. Such information can be used to analyze slow-loading pages and/or image parts.

According a fifth aspect of the invention, server load testing can be performed. The goal of website server load testing is to simulate realistic load in order to determine limits and capacities of the website server machines. The invention accomplishes this goal by taking advantage of the fact that, running with the cache turned off, multiple copies of the test-enabled browser can execute on the client machine each running a separate playback script. All extant copies of the invention can run the same script, or each copy can run a different script, or any combination of the above. The complex of multiple playbacks is called a load scenario and the invention uses a special mechanism that permits a special kind of playback script called a load test script. LoadTest data can be accumulated in a special LoadTest results log that is implemented in accordance with the conventions of the underlying Windows environment. Analyses of these log files is generally well known, and aims to portray the minimum, average, and maximum response times for all playbacks in progress.

According a sixth aspect of the invention, site analysis can be performed. In the invention use is made of standard methods of recursive descent examination of website pages to construct a detailed dependence map showing the relationships between the starting website page Universal Resource Locator (URL) and the child (or dependent) pages via their link structure. In accordance with standard methods (e.g., spider), the search of a website is limited to a user-specified maximum depth, to a user-specified maximum time, and/or to a user-specified maximum number of website pages to visit or links to accumulate. According to this aspect, as this search process is being accomplished, each retrieved page can be passed through one or more quality filters. Filtering, for example, can be based on byte count, presence of spelling errors, presence of strings, download times, etc. The results of the filtering process can be presented to a user in real-time and in a display page that is updated for the user on the Windows desktop each time the respective filter finds new information. In one embodiment, the spider is performed by the test-enabled browser.

Figure 1:
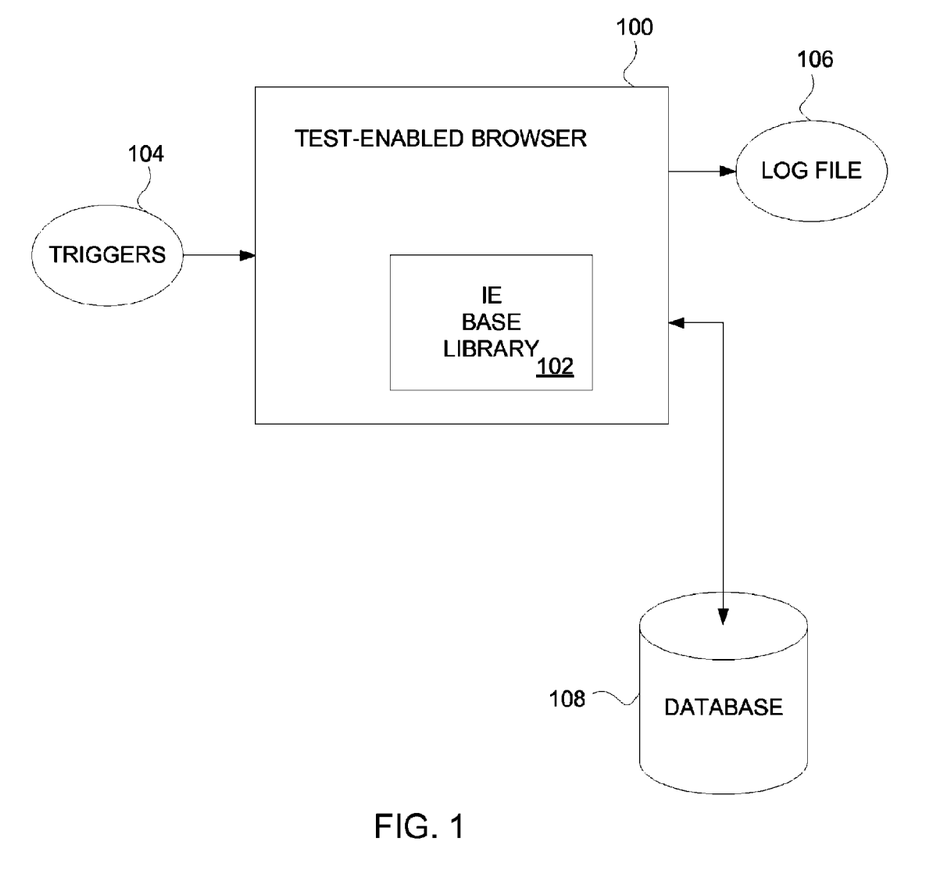
FIG. 1 is a block diagram of a test-enabled browser according to one embodiment of the invention.

FIG. 1 is a block diagram of a test-enabled browser 100 according to one embodiment of the invention. The test-enabled browser 100 is designed to provide automated analysis and testing of websites. The test-enabled browser 100 operates on a computing device (not shown). The test-enabled browser 100 makes use of Internet Explorer (IE) base library 102. In this regard, the test-enabled browser 100, in effect, emulates an IE browser but further provides the capability to perform the automated analysis and testing of websites. The test-enabled browser 100 receives triggers 104 from an operating system. These triggers (or event triggers) are, for example, a mouse click, a mouse drag, a return, text entry, etc. Based on these triggers 104, the test-enabled browser 100 operates to perform the automated analysis and testing of websites. In doing so, the test-enabled browser 100 can produce a log file 106 or can interact with a database 108.

Figure 2:
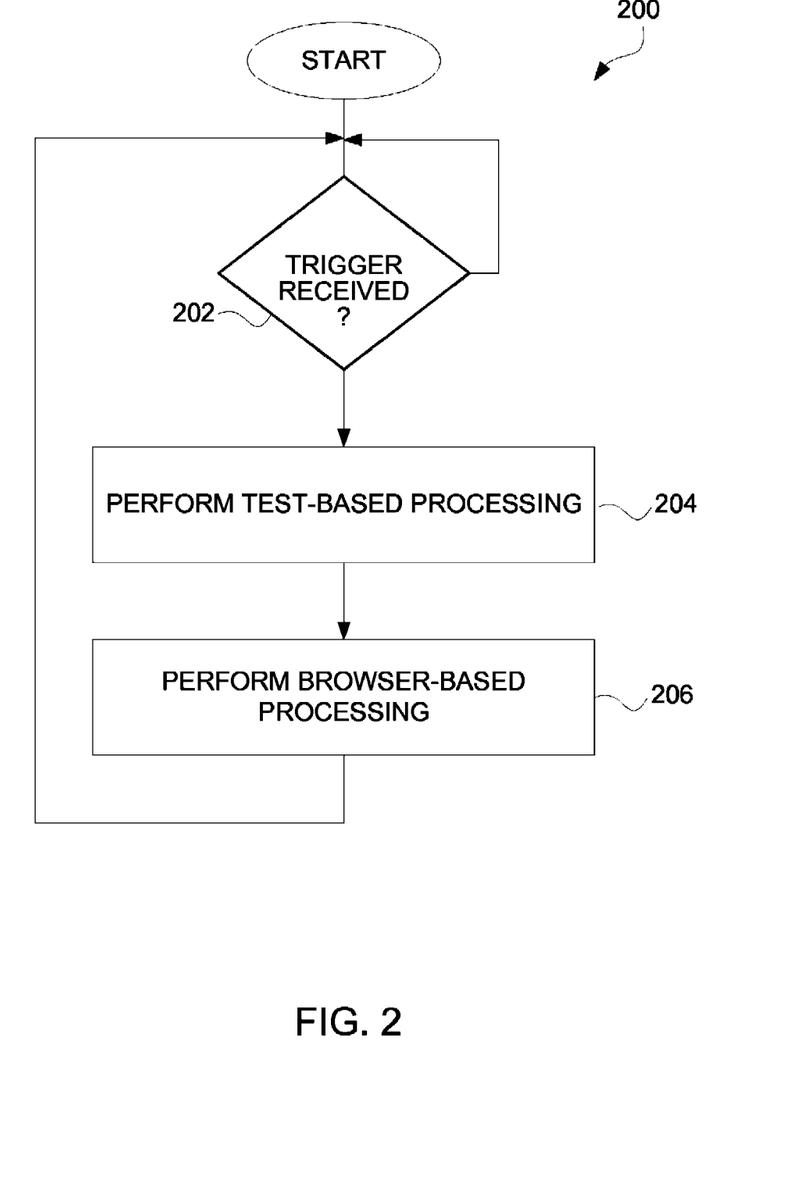
FIG. 2 is a flow diagram of test-enabled browser processing according to one embodiment of the invention.

FIG. 2 is a flow diagram of test-enabled browser processing 200 according to one embodiment of the invention. The test-enabled browsing processing 200 is, for example, suitable for performance by the test-enabled browser 100 illustrated in FIG. 1.

A test-enabled browser processing 200 initially begins with a decision 202 that determines whether a trigger has been received. When the decision 202 determines that a trigger for the test-enabled browser has not yet been received, then the test-enabled browser processing 200 awaits such a trigger. Once the decision 202 determines that a trigger has been received for the test-enabled browser, test-based processing is performed 204. Here, the test-based processing is the processing needed to carry out the particular type of testing being performed on a determined website. Following the performance of the test-based processing, browser-based processing is performed 206. Here, the browser-based processing is processing typically performed by a browser application (network browser). Here, the browser-based processing, in one implementation, can be provided using the code resources stored in the IE based library 102 illustrated in FIG. 1. Following the operation 206, the test-enabled browser processing 200 returns to repeat the decision 202 and subsequent blocks so that subsequently received triggers can be similarly processed.

Figure 3:
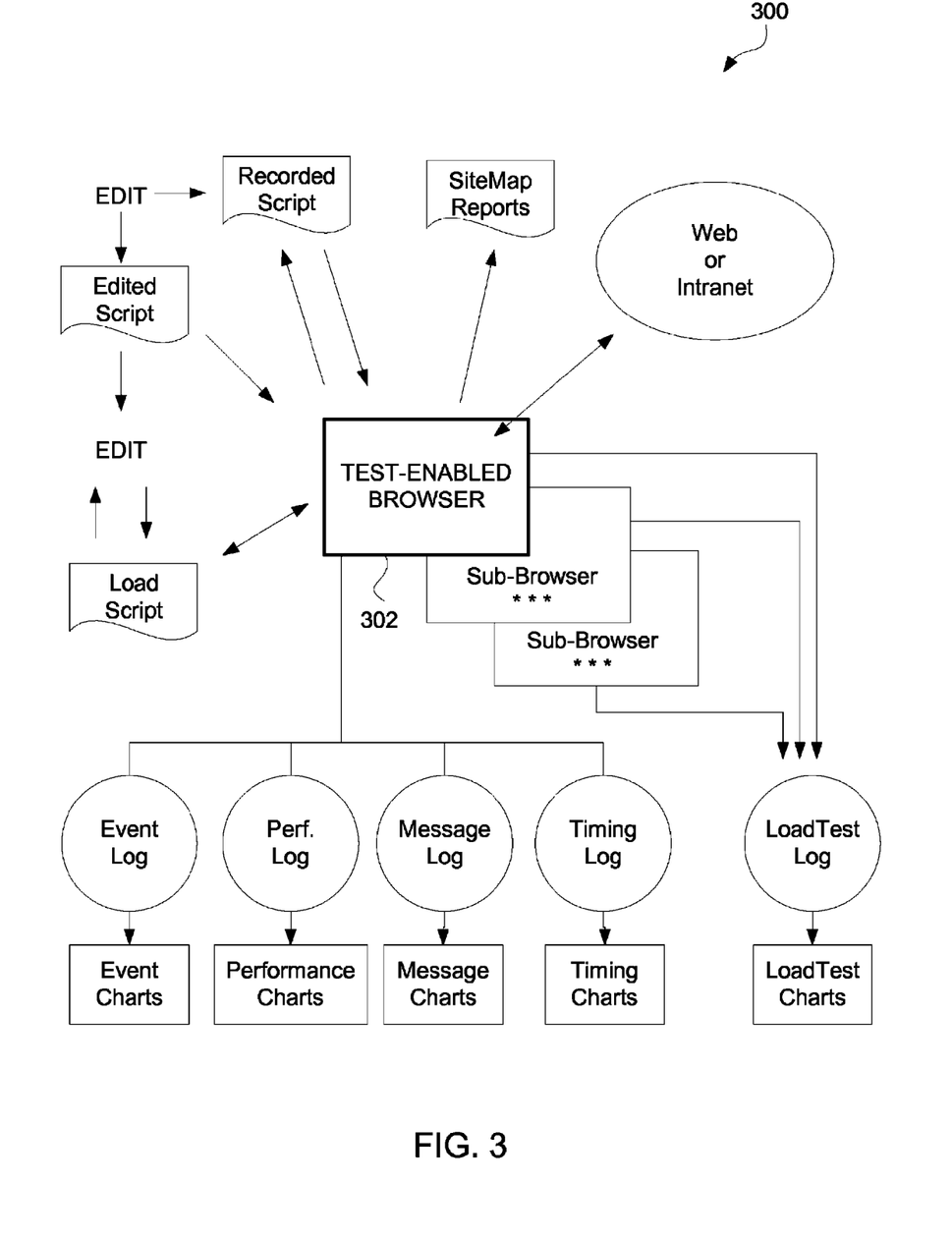
FIG. 3 is a block diagram of a load test system according to one embodiment of the invention.

The test-enabled browser can perform a variety of different tests for websites. One such test is referred to as a load test, in which loads are artificially supplied to a particular website to test its performance and abilities under such circumstances. FIG. 3 is a block diagram of a load test system 300 according to one embodiment of the invention. The load test system 300 is controlled by a test-enabled browser 302. Additional sub-browsers can also be activated to induce additional loads. The test-enabled browser 302 (and any sub-browsers) are coupled to the Internet (web) or intranet so that they are able to access the website under test. The test-enabled browser 302 can produce various reports and can log various different items. For example, as shown in FIG. 3, the test-enabled browser 302 can produce an event log, a performance log, a message log, a timing log and a load test log. These various logs can also be converted into more user-friendly charts. The test-enabled browser 302 can also produce reports, such as a site map report. Still further, the test-enabled browser 302 can record, edit and load scripts.

According to one embodiment, the system and method of the invention can be implemented by a number of elements that work together to accomplish the intended results. In this embodiment, the test-enabled browser is referred to as eValid.

General—OS Context eValid has been implemented with the COM interface available on the Windows NT/2000 operating systems. This interface is described in Reference 2.

General—Normal Browser Operation

In the invention complete verisimilitude with parallel IE technology must be assured to support fully realistic emulation of WebSite behavior. This is accomplished in the invention by using identically the same OS DLLs and other facilities as exist in the parallel IE technology. This technique has the additional advantage that future realizations of the invention will continue to adhere to operation identical with the parallel IE technology because, by convention, these DLLs are add-on libraries and the invention employs the standard technique of overloading these libraries with the specialized functionality needed specifically for the invention.

General—Graphical User Interface (GUI)

The user must be presented with a simple, easy-to-use interface that matches the expectations created in normal browser operation. The GUI in the representative embodiment is shown in outline form in Appendix C. In this diagram each indentation level implies a different additional pull-down sequence in accordance with the conventions usually employed in the underlying Windows environment.

General—Application Programming Interface eValid must provide an interface that accepts script commands directly. This is the Interactive Mode operation of the invention. In the representative embodiment this is accomplished using the Interactive Mode of operation (see below) in which individual commands retrieved from a script file are sequentially processed by having them read from a control file that is designed to the representative embodiment by the user.

General—Script Language

The eValid script language uses a set of keywords and a variable number of arguments that describe details of the action to be performed, or indicate modifications that affect playback. The complete list of script commands, both extrinsic and intrinsic, is made available at script.html. Following convention within the underlying Windows environment this script language format and structure is maintained as a simple ASCII file that is opened when the invention begins making a recording, and which is manipulated in the usual ways prior to initiating a playback.

General—Script Command Format

The format of a command in the invention, and as accomplished in the representative embodiment, is as follows:
Keyword ["Modifiers"] ["FrameID"]

Commands are active (they make something happen to the state of the eValid browser) or passive (they are purely notational). Commands that arise from a live recording are called intrinsic; commands that are added manually to a script are called extrinsic.

---

Logic (Pseudocode)
Script Interpretation During Playback

START
initialize browser to receive scripted playback
open playback script file

| Logic (Pseudocode)<br>Script Interpretation During Playback |
|---|
| reset logfile pointers<br>reset timers<br>while (script lines are not exhausted)<br>read a script line<br>select on keyword<br>if (keyword-N)<br>Analyze arguments<br>Take appropriate action based on keyword<br>(These actions will vary but may include:<br>text entry into a component of the current page<br>navigation to a new page/URL<br>analysis of contents of current page<br>query of the user for further information<br>elseif (keyword-N+1)<br>...<br>endif<br>end select<br>end while<br>signal "Playback Complete"<br>END |

General—Results Logging

To be useful the invention requires recording of information gained from the playback process into files that can be analyzed in a variety of ways. In the representative embodiment this data is kept, IWA the conventions of the underlying Windows environment, in pure-ASCII files wherein each field of data is separated by a reserved character (this is the "tab" character in the representative embodiment).

In the representative embodiment event records are kept in the Event Log file. It captures one record for each action that the test playback engine takes. Three subsets of this data are also generated:

the Performance Log, containing only those event log entries that deal with performance issues;

the Message/Error Log, being only those events that have some importance as an error;

the Timing Log, containing only the outcomes of timing actions.

In the representative embodiment each log file is opened so that information can be appended to it in real time, using the "open for append" convention that applies to ordinary ASCII files as they are handled in the underlying Windows environment.

Record/Play—General

The essential mode of operation of eValid is as a record/playback device. During recording eValid creates a playback script that captures essential information about the activities of the user. During playback eValid reads the script and performs the indicated actions. In the pseudocode below the essential nature of a browser in the representative embodiment is taken to be that in the parallel IE technology, and all conventions are those that apply in the underlying Windows environment.

| Logic (Pseudocode)<br>Record Loop |
|---|
| START<br>initialize system to preset variables<br>open script file<br>while (user has not indicated to STOP recording)<br>Using the address line in the browser, render the current page.<br>If (mouse click)<br>Record the location and meaning of the click, and |

| Logic (Pseudocode)<br>Record Loop |
|---|
| perform any indicated operations.<br>Else if (mouse drag)<br>Record the origin and destination<br>Else if (keyboard entry)<br>Record the keystroke.<br>Endif<br>Make appropriate modification to script file based on<br>change of state in the browser.<br>end while<br>close script file<br>END |

Record/Play—Applets and/or ActiveX Controls

The invention, as demonstrated in the representative embodiment, uses built-in mechanisms for recording Java Applets and/or ActiveX controls when these devices are employed within WebSites. During recording when ActiveX controls are encountered activity is recorded direct from the invention's screen using mouse click and keyboard activity. In fact the invention follows the conventions for processing these kinds of objects in accordance with the properties of the parallel IE technology and employing the conventions of the underlying Windows environment.

Record/Play—Keyboard Actions eValid must provide a mechanism for recording keyboard and mouse actions.

Keyboard activity includes TAB's and function keys. Mouse activity includes right and left clicks and double-clicks. All of the normal modes of the keyboard and mouse, specifically limited to how they interact with the test enabled web browser, are emulated identically with the parallel IE technology because the implementation is in accordance with the properties of the underlying Windows environment.

Record/Play—Modal Dialog Support

To assure reliable operation the invention includes a method for recording activity in a modal dialog, a kind of unitary operation available to browser such as in the parallel IE technology, and normal for browser windows operating in the underlying Windows environment. The method used in the invention is to record required modal dialog using access provided from the script window view. This method assures that control can be given to the user during a time when, otherwise, the browser has focus within the underlying Windows environment.

The actions that can be recorded to control a modal dialog include all keyboard and mouse-click events.

Record/Play—Applets

Processing of Java Applets within the invention is accomplished automatically as the consequence of the implementation base chosen. That is, because the invention is implemented in accordance with the parallel IE technology and using the underlying Windows environment, processing of Java Applets happens without extra effort.

Record and play of activity with a Java Applet is limited to absolute mouse movement and/or keyboard activity, which activity is itself within the constraints of the underlying Windows environment and similar to that accomplished with the parallel IE technology. Accordingly, in the invention recordings are made using the absolution mouse location and/or actual keyboard activities as the trigger events.

Record/Play—Application Mode

During the recording process the user can signal a change in internal recording state using the control GUI from the normal recording mode to Application Mode recording. This mode has the advantage that it can apply not only to activity within the browser window but also to any other application launched by the test enabled web browser that exists on the Windows desk-top.

In application mode recording only keyboard activity, mouse click, and mouse drag activity is recorded. In application mode the only validation modes are a partial image synchronization and validation of text that is selected by the user and put into the clipboard, a logical area that is maintained by the underlying Windows environment, that contains the results of a COPY instruction.

Record/Play—Javascript

Processing of Javascript within the invention is accomplished automatically as the consequence of the implementation base chosen. That is, because the invention is implemented in accordance with the parallel IE technology and using the underlying Windows environment, processing of WebSite pages that contain any form of Javascript happens without extra effort.

However, some Javascript implementations involve change of state of the underlying test enabled web browser without necessarily involving any navigation events. Such activity is recorded in terms of absolute clicks and/or type-ins, in accordance with the conventions established by the underlying Windows environment.

Record/Play—Multiple-Window (Sub-Browser) Operation

In accordance with the representative environment the special web browser must test WebSites that evoke multiple windows reliably. Some WebSites use several techniques (e.g. with JavaScript) to cause automatic opening of a new Browser. Reliable testing of such sites requires being able to be able to record and play back such sub-sites.

In the representative environment this is accomplished by automatically opening a second instance of the testing browser, one already designated to be in record mode, whenever the parent page requests a new window. In the representative environment resulting sub-script is recorded in an script file named automatically and systematically by eValid according to the sequence number of the sub-browser that was launched and the depth of nesting of the recording sub-browser. In the representative environment this numbering scheme post-pends the Count and the Depth to form a script name of the form: $basescript-Count.Depth.

During playback the representative environment automatically launches a copy of the special browser in response to the LaunchSubBrowsercommand and instructs the launched sub-browser to play back the indicated sub-script. This accomplishes the effect of simultaneous parent and child playbacks exactly as was recorded initially.

Logic (Pseudocode)
Multiple Window Playback

```
START
Initialize browser.
Initialize logfiles.
While (Script file is not exhausted)
If (command involves sub browser)
Launch an eValid sub-browser with instructions
to play back the indicated sub-script automatically.
Else If (command is normal command)
Process command normally.
End While
END
```

Record/Play—Page Synchronization

In the representative environment playback play back of pages is completely synchronized so that coherence in the simulation of the user is complete and accurate. Synchronization in the representative environment is achieved by access to the page download complete primitive in the underlying Windows environment. The use of this facility is identical to that used in the parallel IE technology and uses the same primitives as in the underlying Windows environment. In the representative environment, however, special care is taken to note the times at which each page part arrives so that these times can be reported to the user for separate analysis.

Record/Play—Checksum Synchronization

During playback of certain pages from some WebSites the normal page synchronization must be augmented with additional methods to assure that playback is realistic and complete. In the representative environment this is accomplished by having the user identify two locations on the screen at the point at which the synchronization is to occur. At this point in the representative environment a checksum is computed that is the linear sum of the bitwise representations of each displayed pixel. This value is written into the script file for use during playback. At the time of playback the image displayed on the browser screen as it was received by the current response from the WebSite is analyzed based on the content of the recording and a new checksum is generated from the current image. Only in case the two checksums match does playback continue. If the checksums do not match then after a fixed delay, in the representative environment a period of 1.0 seconds, the checksum is recomputed. If after a maximum time specified by the user, measured from the clock capabilities in the underlying Windows environment, synchronization is not achieved then an error message is written to the appropriate logfile.

Record/Play—Link Wizard

The recording process is augmented in some cases by taking advantage of the internal properties of the WebSite page under test. A special Link Wizard function is included that creates a special kind of recording, based on the link content of the current WebSite page. In that recording there is a GoTo type reference to each URL that is mentioned in an anchor tag. The effect of this recording is to cause, during a subsequent playback, an automatic visit to each of the URLs [or links] that are included on the page.

Record/Play—Form Wizard

The recording process is augmented in some cases by taking advantage of the internal properties of the WebSite page under test. A special From Wizard function is included that creates a special kind of recording, one that artificially records fill-ins of pre-set values for each FORM element in the current WebSite page. This script has the property that, on playback, every named, user-accessible form value is given a specific content prior to execution of the SUBMIT associated with that form.

Validation—General

Test validation means to confirm that content or descriptions recorded earlier matches what is retrieved from the WebSite now. Validation is the basis of regression testing and also is the basis of tests that confirm content as a way to demonstrate correct operation of the WebSite under test. In most testing activities validation is the distinguishment between tests that merely exercise vs. tests that inform.

In the invention validation processes are customized to match the type of object for which validation is attempted. These objects include:

Pieces of text or entire pages of text visible on the browser screen (validate selected text), or parts of pages that are selected onto the clipboard (validate clipboard contents).

Images or parts of images (validate image and validate & synchronize partial image)

The textual contents of a table cell (validate table cell).

Validation—Validate Image

During recording of validation data about an image the user is given the opportunity to identify the image by highlighting it, using the highlight capability built into the underlying Windows environment and used by both the invention and by the parallel IE technology to identify an object. Once identified by the user, the invention records the name of the image and certain of its properties (e.g. size and date of origin) into the script. On playback if the information recorded differs from the information that is received at playback time then error messages are issued.

Validation—Validate Table Cell

WebSite pages that contain tables organize information in to table cells, and a key capability is to be able to record the entire contents of a table cell for future comparison. In the invention the validation of a text particle can be extended to all of the text in a table cell using a special command sequence. In the representative embodiment the user selects at least one byte of a particular table cell and this is automatically interpreted as meaning in effect the entire textual content of that particular table cell.

Validation—Validate [Selected] Text

In the representative environment one must be able to confirm content of text on one or more elements within a page it has downloaded.

During recording the user highlights a text passage or passages on the screen, and then commands Validate Selected Text. This causes the selected text to be recorded in the script file for validation during playback. Additional information recorded is the page element number and the byte-count of the offset of the selected string from the beginning of the page element text.

During playback the actual retrieved page is analyzed for the content that was saved in the script file. If the retrieved page matches content wise playback continues; if not an error message is issued. The string match takes into account the offset of the string from the beginning of the string at the specified element.

---

Logic (Pseudocode)
Validate Selected Text During Playback

---

START
Assume eValid browser in operation.
Assume command "ValidateSelectedText" has been detected.
Extract MatchString from command to match against current page content.
Element = 1
While (Element < MaxElements)
If (MatchString contained in element)
Return OK
Else Kf
Continue
End If
End While
Return Error (Selected Text Not Validated)
END

---

Playback—Batch Mode

In the representative environment a means is included to provide operation of the invention using the batch mode capabilities available within the underlying Windows environment. In this mode selection of playback values and other parameters is accomplished by means of command line switches such as normally included in executable objects that run in the underlying Windows environment.

Switches defined in the representative embodiment, using the conventions normally used in the underlying Windows environment, are defined in detail in Appendix B.

Playback—Interactive Mode

Provision in the representative environment is made for user-interactive operation by taking advantage of certain common properties in underlying Windows environment's handling of I/O files. In the interactive mode of operation the invention reads commands that are provided by an outside agent into an input file by first opening the file for read access, reading all commands there, and then returning the file to closed status after the invention has executed all of the commands. The exactly same command interpretation mechanism in the invention is used as in normal foreground-mode playback of scripts.

Playback—Multiple/Repeat Playback

In the representative environment the ability exists for a user to play back a script again and again. First the candidate script file is opened using the normal facilities of the underlying Windows environment and the playback is continued until the end of the script is reached. In the representative environment two modes are available to repeat this execution. In the invention the first mode repeats the playback a fixed number of times, and in the second mode the invention repeats the playback an indefinite number of times, until the user of the invention interrupts the process.

Playback—Alarms

In the invention there is a capability to set a special timer, using the facilities available in the underlying Windows environment, and if the timer has expired by the time a user-specified place in the script file the playback automatically issues an alarm. The alarm process includes executing a CGI-BIN on the WebSite under test or some other WebSite and/or issuing an email message using the email processing available in the underlying Windows environment.

Playback—Synchronization

While recording of activities such as navigation may be interrupted by the user, eValid on playback a script must be entirely synchronized. This means that a requested page must be fully downloaded and rendered in its entirety before eValid continues operation.

Playback—Cache Management

In browsers normally available to the underlying Windows environment a cache is used to store WebSite pages or WebSite page parts after they have been downloaded so that representation of these WebSite pages to the user is quicker and does not require re-access of the data to the WebSite server. In the invention this cache is used identically with that of the parallel IE technology but the invention provides user control over this cache area within the underlying Windows environment.

In the representative environment the user is given, by means of special selection menus, the ability to delete the entire contents of the cache, to delete all of the cookies in the cache. In addition, in the invention the playback engine can be commanded to never use cache and never use cookies. This is done to assure the precision of download timings and file sizings when doing timing/tuning work with the invention.

Playback—Extrinsic Commands

Although many commands are created interactively in the invention when the user makes a recording, additional extrinsic commands are available to the user within the invention so that special effects can be achieved during playback. A complete list of these commands is available in the script.html file.

Playback—Secure Sessions

In the representative environment use of secure protocols is assured by taking advantage of the parallel capabilities available in the underlying Windows environment. The standard of performance is the parallel IE technology browser, and the invention achieves the necessary identicality by taking advantage of the same DLLs that exist in the underlying Windows environment.

Playback—Adaptive Playback

Playback of a script including validations and other actions must not be unduly sensitive to unimportant changes in the WebSite.

Many HTML pages are created dynamically. This means the page is created each time a user requests it and may contain slight variations based on user activity and other factors. For testing purposes it is important that playback work independent of variations produced in dynamically created pages.

Adaptive Playback is intended to provide reliable test playback on sites that use dynamically created HTML Pages.

On recording the HTML index is recorded, along with the Name|Value pair for that element.

On playback eValid attempts to match the element at the recorded page index. If it matches, it sets the value, as specified (or clicks the button/image) Otherwise, it searches the page for an absolute match with the Name|Value pair. If it finds it at some other index, it carries out the necessary processing. A MESSAGE message is given to the user; playback will continue as normal.

If it does not find it, an ERROR message is given to the user, & the playback fails at that point (until the next GOTO command).

The advantage of this feature is that the HTML page being checked does NOT have to be identical in structure to the one recorded.

User Responsibility: The user must ensure that each <INPUT> Element on the page has a unique Name|Value pair. If any pair is duplicated, playback is not guaranteed to succeed.

---

Logic (Pseudocode)
'FollowLink' Function of Adaptive Playback

```
START
--Search for link at specified (recorded) index on page.
If (link NOT found)
GoTo SEARCH
Else
Compare Visible Texts
If (visible texts NOT match)
GoTo SEARCH
Else
Compare URLs
If (URLs NOT match)
Compare base URLs (up to first "?")
If (base URLs match)
Compare GET Data Strings
Output Name-Value pairs mismatch message(s)
Else
Output mismatch base URL message
End If
End If
Click Link (whether or not URL matches)
Output Going to ... message
End If
End If
GoTo END
```

---

Logic (Pseudocode)
'FollowLink' Function of Adaptive Playback

```
SEARCH
--Look for matching Link elsewhere on page
var FOUND = FALSE
For (every index from 0-n)
If (Base URL && Visible Text both match)
FOUND = TRUE
Click Link
Output "Found at New Index ..." message
End If
End Loop
If (NOT FOUND) Output "Fail" message
END
```

Timing—General

During playback the amount of time required to complete certain actions must be collected and recorded for analysis. Timing at 1 msec. resolution is a requirement.

Timing—Detailed Timing eValid must time component-by-component download and rendering times accurately.

When a page downloads using the HTTP protocol there are several steps that a browser takes to completely download the information that is used to present a complete representation to a user. This feature of eValid provides for collecting detailed timings. The steps involved in a page download and which are timed individually are: DNS lookup, Redirection(s), Base page, Component page(s), Final page rendering.

---

Logic (Pseudocode)
Detailed Timing

```
START
Empty current cache if not already empty.
Reset timers.
Start page download.
While (page download has not finished)
IF (DNS lookup is complete)
Record time for DNS lookup.
Else If (Redirection is sensed)
Record time for redirection.
Else If (1st byte of download has arrived)
Record time for 1st byte.
Else If (Base page has downloaded)
Record time for base page download.
Else If (component page has downloaded)
Record time for component page download.
End
End While
Record total time.
END
```

Timing—Charting

In the representative embodiment after a sequence of one or more playbacks has populated one or more logfiles, it is useful to represent the relative times measured and recorded in specialized timing charts. These charts are rendered using both the capabilities in the underlying Windows environment but also though the use of Java Applet programs that read the logfile and present the data to the user via the Applet rendering to the screen, in much the same way as any Java Applet renders output the browser screen in the parallel IE technology.

LoadTest—Load Generation

In the invention imposition of load upon a WebSite server via the client machine is accomplished with multiple executions of the invention on the same machine. If two or more copies of the invention are executing at the same time, and both have their cache functions turned off, the load imposed on the WebSite server will be as if an equivalent number of actual users are simultaneous running the same tests.

LoadTest—Multiple Parallel Browsers

Because the goal of WebSite server load imposition is to learn if and when WebSite server capacity is reached, this work can be done very realistically by simultaneous playback of multiple scripts by the invention.

To simplify control of such multiple playbacks a simple method is used so that a loadtest script can make explicit command line references to independent copies of the invention. In the representative embodiment this is accomplished using a special name, _eValid, to indicate that a sub-browser or independent sub process is to be launched. Such parallel processes are launched using facilities extant in the underlying Windows environment.

LoadTest—Scenario Creation

A load test scenario, to be realistic and representative of the mix of uses to which a WebSite is put, should include a range of different types of behavior. The invention accomplishes this goal by providing for playback of multiple copies of the test enabled web browser on one or more client machines, but without restricting the script that each can play back. To assure accuracy, the playbacks in a load test are always done without the use of the browser cache, as described elsewhere. The consequence of this is that the load test designer has complete freedom to run as many tests of whatever mix on the client machines subject only to machine hardware and memory resources.

LoadTest—Reporting

To consolidate reported results all parallel executing sub-browsers all write their results to a single LoadTest log. The format of this log is the same as for other log files. Facilities of the underlying Windows environment are used to make sure that records from any two browsers that complete their activity at a particular time do not have their records mixed. This is done with record lock and unlock processes available in the underlying Windows environment.

Site Analysis—General

Site Analysis refers to a capability in the invention to recursively analyze all WebSite pages beginning with the current WebSite page or URL and continuing to visit all WebSite pages that are referenced by the original WebSite page. The search process used is called, in computer science terminology, a pre-order breadth-first traversal of the WebSite dependence tree with constraints, and is a standard method for constructing a dependence tree.

---
Logic (Pseudocode)
Site Analysis Tree Generation
---

```
START
Initialize tree to empty.
Initialize work list to contain the current URL as unmarked.
Initialize constraints using defaults or user inputs.
while (no constraints have been exceeded)
Read current work list's first occurring unmarked page.
IF (URL contains a blocked string)
Continue
Else if (URL is below the base URL)
OR (URL is in the acceptable list of URLS)
Extract all URLs mentioned in the current page.
Add any new URLs found to the work list as unmarked and annotate
the entry to show the current URL as the parent.
```

---
-continued

Logic (Pseudocode)
Site Analysis Tree Generation
---

```
Mark the current URL in the work list as marked.
Otherwise
Continue
end while
END
```

Site Analysis—Limits

As implemented in the representative embodiment this search process described above is constrained by user-supplied specifications on such factors as the following:
The depth of the search away from the based WebSite page.
The total number of pages to be visited.
The total amount of time to be spent searching.
Whether any specified strings are to be excluded from further searching.
Whether any additional base pages are to be included in case they are encountered.

Site Analysis—Protocols

During the search of the WebSite under examination, the invention gives the user the choice of protocols types to use (and to not use). These protocols are normally those found on the underlying Windows environment and encountered in operation of either the test enabled web browser or with the parallel IE technology.

Site Analysis—Files

As the site analysis process continues to completion a complete dependence map between URLs visited. At the end of the process the user can select one of these output representations:
List of URLs visited in the order in which they were encountered (URL List).
List of URLs visited arranged in a tree that shows the complete parent-child dependency for the entire WebSite mapped (Complete SiteMap).
List of URLs visited arranged in a tree that shows the complete parent-child dependency for the entire WebSite mapped but only shows each unique URL once, in the first instance it was found (Irredundant SiteMap).
These reports have great value besides documenting URLs visited because they capture the dependence tree between and among the URLs and also identify URLs that could not be reached.

Site Analysis—Filters & Reports

As the site analysis process continues each WebSite page is examined for certain properties. In the representative embodiment the following reports are generated:
Unavailable links.
Links that load slower than a user-specified time.
Links that have creation dates older than a user-specified time.
Links that are larger than a user-specified size.
Links that contain a user-specified string.
These data are useful in searching a WebSite for a particular page or property, for finding which WebSite pages are slow loading, or identifying broken WebSite links. Additional filters that match this criteria can be added as a field customization.

The invention, or aspects thereof, are further described by the following numbered paragraphs:

A method for recording software tests within a test enabled web browser. Here, the context is the use of a test enabled web browser that is implemented in accordance with IE technology, except that additional controls are made available to the user direct from a graphical user interface (e.g., toolbar) to provide user access to all of the dynamic functionalities described herein. This is accomplished by building the invention using the DLLs available within the parallel IE technology and extant in the underlying Windows environment.

A method for extracting details from a current page, e.g. text, or image checksums, or HTML item count, etc. This is accomplished using the Document Object Model (DOM) available within the underlying Windows environment that emulates operation of the IE technology. In one embodiment, a current page is analyzed for properties of interest to the user, as specified and selected with user pull-down menus, and the required data is recorded into a script file for later comparative use during playback.

A method for expressing these details in the recorded script language. The recordings extracted from live sessions are expressed in compact form using commands that indicate the action to be taken and the effect to be achieved. These commands are dynamically and interpretively executed during test playback based on the properties extant within the underlying Windows environment, and in accordance with the IE technology implementation as a base.

A method for playing back and confirming website page content and performing other validation steps based on prior recordings. Commands within a script are dynamically and interpretively executed during test playback based on the properties extant within the underlying Windows environment, and in accordance with the IE technology implementation as a base. Because of this implementation base the activity of the invention is object-oriented, independent of browser size and settings, and fully synchronized during playback activities that involve download of website pages.

A method to synchronize playback of scripts based on checksum content of selected sub-image. During recording an image or partial image is designated by the user as important for validating content has its properties recorded as a checksum, the value of which is stored in the script file. On playback the same website page is retrieved and similar data is extracted from it. If the playback-time extracted data does not match the recorded information then an error message is issued.

A method for detailed timing of download of a website's many parts individually and collectively. In this claim the invention employs detailed management of the browser cache that is available as part of the underlying Windows environment. The method is capable of measuring the size and download time of each website page component, including linked components, base pages and images. This detailed timing information can be reported by the test-enabled web browser into a set of ASCII files implemented in accordance with the conventions of the underlying Windows environment.

A method for automatically adapting playback to account for minor website changes. If during playback a current website page differs by a slight amount, then the invention compensates for such differences by searching up and down within the current website page, using the DOM access methods, until it finds a nearly correct match at which point it proceeds with playback.

A method for creating realistic load by playing back multiple independent browsers on the Windows desktop. Individual playbacks of scripts can be replicated on a client machine within a special LoadTest type playback script that includes the capability of launching a second, subsidiary copy of the test enabled web browser with a specified playback script. Using the ability of each test enabled web browser to manage the cache, the method can play back each script independently and without use of the cache, with the effect of simulating multiple users from the client accessing the target website or websites.

A method for analyzing complete websites by use of recursive search methods based on current link content of pages (i.e., spider in a browser). Using standard computer science principles and algorithms that achieve recursive-descent analysis of dependent pages, the method automatically develops a complete map of a website, subject to size, time, and depth constraints. It accomplishes this construction using the DOM provided information that is available because the invention is built in accordance with the conventions of the underlying Windows environment.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

Additional details on testing and analysis of websites are contained in Appendices A-F of parent application U.S. patent application Ser. No. 10/041,768, filed Oct. 31, 2001, and entitled "METHOD AND SYSTEM FOR TESTING WEBSITES", which is hereby incorporated by reference herein and forms part of this application. The Appendices are as follows:

Appendix A is a User's Guide for eValid 3.1

Appendix B is a description of an exemplary Script Language.

Appendix C is a description of a Command Line Interface.

Appendix D is a description of a Graphical User Interface (GUI) Map.

Appendix E is a description of additional load testing information including a LoadTest Description, a description of Load Test Playback Fidelity Comparison, a description of Notes on Simulating Many Users to induce a load test, and a description of Machine Adjustments for eValid LoadTest Operation.

Appendix F is a description of WebSite Testing.

Appendix G is a description of WebSite Loading and Capacity Analysis.

Appendix H is a description of WebSite Mapping.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A non-transitory computer readable medium including at least computer program code stored therein for providing a test-enabled browser for testing a website residing on a network, said computer readable medium comprising:

computer program code for interfacing with web browsing components, the web browsing components including Document Object Model (DOM) access methods included in Dynamic Linked Libraries associated with a browser code library;

computer program code for accessing a website to be tested;
computer program code for rendering and examining at least one web page of the website so as to at least (i) extract details of elements of the web page, and (ii) store the details of the web page in a recorded script;
computer program code for selecting a validation test to be performed; and
computer program code for performing the validation test using at least one of the DOM access methods of the web browsing components, wherein during the validation test, the at least one web page is newly rendered and details of elements for the at least one web page as newly rendered are accessed via the at least one of the DOM access methods and compared to the stored details in the recorded script.

2. A computer readable medium as recited in claim 1, wherein the web browsing components are accessible by the test-enabled browser.

3. A computer readable medium as recited in claim 1, wherein the details extracted for at least one of the elements of the web page includes properties and associated values.

4. A computer readable medium as recited in claim 1, wherein the details extracted for at least one of the elements of the web page includes an element count for the web page.

5. A computer readable medium as recited in claim 1, wherein said computer readable medium comprises:
computer program code for logging details of test execution to a log file for post-test analysis.

6. A computer readable medium as recited in claim 1, wherein said computer readable medium comprises:
computer program code for automatically adjusting input values through parametric substitution of values into the test script.

7. A computer readable medium as recited in claim 1, wherein computer readable medium comprises:
computer program code for validity of links within the at least one web page that is newly rendered.

8. A computer readable medium as recited in claim 1, wherein computer readable medium comprises:
computer program code for checking user-selectable objects on at least one web page.

9. A computer readable medium as recited in claim 1, wherein said computer readable medium comprises:
computer program code for automatically synchronizing page delivery, including downloading and rendering.

10. A computer readable medium as recited in claim 1, wherein a remote server couples to the network and hosts the web page, and
wherein said computer readable medium comprises:
computer program code for load testing to test performance of the remote server regarding the webpage in accordance with a load resulting from multiple instances of the test-enabled web browser.

11. A computer readable medium as recited in claim 1, wherein the at least one webpage is a dynamic web page, and wherein said computer program code for performing the validation test comprises:
computer program code for comparing the dynamic web page using a rendering of the web page by the test-enabled browser against at least one prior rendering of the dynamic webpage.

12. A computer readable medium as recited in claim 1, wherein the at least one web page has a DOM data structure, and
wherein said computer program code for performing the validation test comprises:
computer program code for recording a script pertaining to an interaction sequence with the web page by sensing events with respect to the DOM data structure that reflects a prior rendering of the at least one web page; and
computer program code for subsequently playing back the script by sending events to the DOM data structure that reflects the current rendering of the at least one web page to confirm content of the web page relative to the recorded script associated with the prior rendering of the at least one web page.

13. A computer readable medium as recited in claim 1, wherein the web page includes a plurality of component parts, and
wherein said computer program code for performing the validation test comprises computer program code for determining download timings for at least a plurality of the component parts of the web page.

14. A computer readable medium as recited in claim 1, wherein the details of the elements of the web page include at least information concerning at least one of organization, structure, performance and content of the elements or the web page.

15. A computer readable medium as recited in claim 1, wherein the details of the elements of the web page include at least information concerning at least performance and content of the elements.

16. A computer readable medium as recited in claim 1, wherein the web page includes a plurality of component parts, and
wherein said computer program code for performing the validation test comprises:
computer program code for determining download timings for at least a plurality of the component parts of the web page; and
computer program code for comparing the download timings to at least one threshold.

17. A computer readable medium as recited in claim 16, wherein the at least one threshold is user-provided.

18. A computer readable medium as recited in claim 1, wherein the computer program code for performing the validation test includes at least computer program code for performing adaptive playback of the recorded script with respect to the at least one web page as newly rendered.

19. A computer readable medium as recited in claim 18, wherein the computer program code for performing adaptive playback of the recorded script with respect to the at least one web page as newly rendered comprises computer program code for searching the at least one web page as newly rendered for at least one element of the at least one web page.

20. A computer readable medium as recited in claim 18, wherein the computer program code for performing adaptive playback of the recorded script with respect to the at least one web page as newly rendered using at least one search method that is able to locate at least one element that is in a different location in the at least one web page as newly rendered as compared to a previously rendered web page associated with the recorded script.

21. A computer readable medium as recited in claim 18, wherein the at least one web page include a plurality of links provided at particular positions within the web page, and
wherein the computer program code for performing adaptive playback of the recorded script with respect to the at least one web page as newly rendered using at least one search method that is able to locate at least one of the links that is in a different location in the at least one web page as newly rendered as compared to a previously rendered web page associated with the recorded script.

22. A computer readable medium as recited in claim 1, wherein said computer readable medium comprises:
computer program code for indicating where a scan of the website is to begin by specifying a starting URL, and where the scan is to end by specifying a stopping point.

23. A computer readable medium as recited in claim 1, wherein said computer readable medium comprises:
computer program code for examining the webpage to determine if the webpage meets user-specified criteria.

24. A computer system for testing a website, comprising:
a memory for storing computer program code; and
a processing unit configured to execute the stored computer program code,
wherein the stored computer program code supports testing of a website by implementing a test-enabled browser, and wherein the stored computer program code includes at least:
computer program code for interfacing with a browser code library including at least Dynamic Linked Libraries that provide at least Document Object Model (DOM) access methods;
computer program code for accessing the website to be tested using the test-enabled browser;
computer program code for rendering and examining at least one web page of the website so as to at least (i) extract details of elements of the web page, and (ii) store the details of the web page in a recorded script; and
computer program code for performing a validation test using at least one of the DOM access methods of the browser code library, wherein during the validation test, the at least one web page is newly rendered and details of elements for the at least one web page as newly rendered are accessed via the at least one of the DOM access methods and compared to the stored details in the recorded script.

25. A computer system as recited in claim 24, wherein the computer program code for performing the validation test includes at least computer program code for performing adaptive playback of the recorded script with respect to the at least one web page as newly rendered.

26. A computer system as recited in claim 25, wherein the computer program code for performing adaptive playback of the recorded script with respect to the at least one web page as newly rendered comprises computer program code for searching the at least one web page as newly rendered for at least one element of the at least one web page.

27. A computer system as recited in claim 24, wherein the details of the elements of the web page include at least information concerning at least one of organization, structure, performance and content of the elements or the web page.

28. A computer system as recited in claim 24, wherein the details of the elements of the web page include at least information concerning at least performance and content of the elements.

* * * * *